March 11, 1952  E. KRANTZ  2,588,637
RETRIEVING DEVICE

Filed Dec. 18, 1950  2 SHEETS—SHEET 1

INVENTOR.
ERNEST KRANTZ.
BY
Robert A. Sloman
ATTORNEY.

March 11, 1952  E. KRANTZ  2,588,637
RETRIEVING DEVICE
Filed Dec. 18, 1950  2 SHEETS—SHEET 2

INVENTOR.
ERNEST KRANTZ
BY
Robert A. Sloman
ATTORNEY.

Patented Mar. 11, 1952

2,588,637

UNITED STATES PATENT OFFICE 2,588,637

RETRIEVING DEVICE

Ernest Krantz, Detroit, Mich.

Application December 18, 1950, Serial No. 201,449

6 Claims. (Cl. 9—9)

This invention relates to a device for locating and recovering sunken articles and more particularly to a retrieving device including a line attached at one end to the article and having a cork on its free end.

It is the object of the present invention to provide a simple and inexpensive retrieving device which includes a cork and line attached to the article together with a mechanism for releasing the cork upon immersion of the said article.

It is the further object of the present invention to provide a device for locating and recovering sunken articles which include a water soluble locking device whereby the cork and line may be automatically released.

These and other objects will be seen from the following specification and claims in conjunction with the appended drawings in which—

It will be understood that the above drawings illustrate merely a preferred embodiment of the invention and that other embodiments are contemplated within the scope of the claims hereafter set out.

Figure 1:
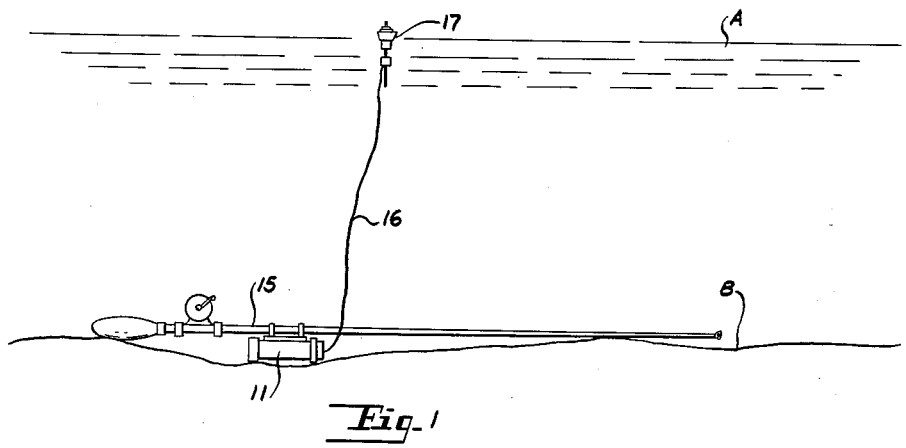
Fig. 1 is an elevational view of the present device as attached to an immersed fishing rod wherein the cork and line have been released.

Referring to the drawings, Fig. 1 illustrates a fish rod 15 which is resting upon the bottom B of a body of water whose surface level is indicated at A. The present retriever mechanism has a cylindrically shaped housing 11 which is suitably clipped or otherwise secured to the rod 15 and there is provided a line 16 and a cork 17 normally stored within housing 11 as shown in Fig. 2 but which is automatically released therefrom upon immersion with the cork seeking the water level as shown in Fig. 1.

Figure 2:
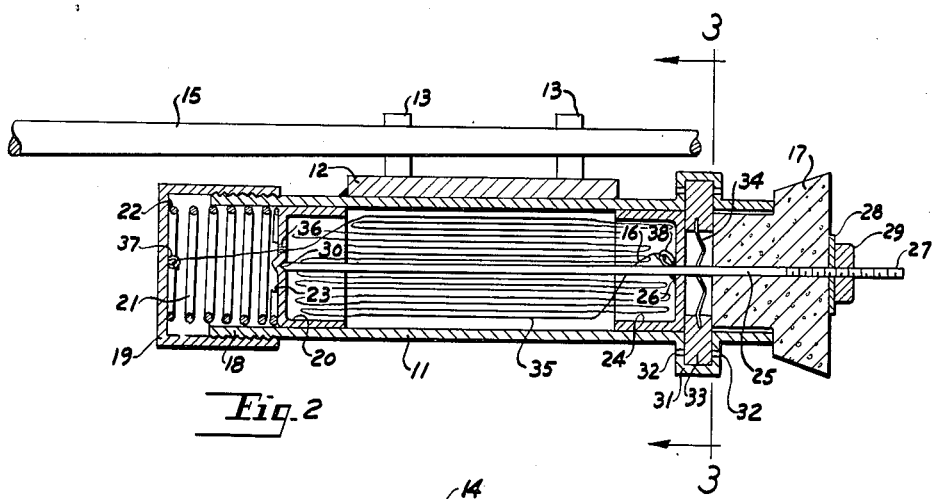
Fig. 2 is an elevational section of the retrieving device.
Figure 3:
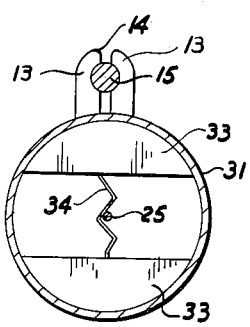
Fig. 3 is a section on line 3—3 of Fig. 2.
Figures 4, 5:
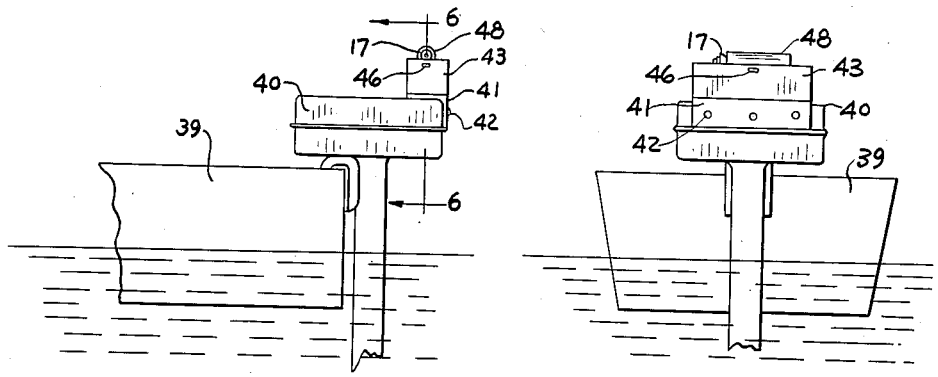
Fig. 4 is an elevational view of a slight variation of the retrieving device adapted for use in conjunction with a heavy article such as an outboard motor mounted upon a boat fragmentarily shown.
Fig. 5 is an end elevational view thereof.

Referring to Fig. 2 a suitable mounting plate 12 is secured to housing 11 and includes a pair of spaced clip elements 13 bifurcated at 14 and additionally recessed so as to snap over rod 15 in the manner illustrated in Figs. 2 and 3.

Cork 17 has a cylindrical shank of such dimension as to be loosely received within the open end of housing 11. The opposite end of said housing is threaded at 18 to receive threaded cap 19. Inwardly directed cup shaped element 20 is slidably positioned within housing 11 and coiled spring 21 is interposed between element 20 and cap 19 secured to cap at 22 and similarly secured at its opposite end at 23 to element 20.

There is provided a second inwardly facing cup shaped element 24 which is also slidably positioned within housing 11 and is secured as at point 26 to the rod 25 which extends through cork 17 and element 24.

Rod 25 is threaded at 27 and receives washer 28 and the nut 29 to secure cork 17 thereon. The opposite end of the rod 25 extends longitudinally into housing 11 and its inner end operatively bears within a central depression 30 formed in cup shaped element 20.

Hollow annular flange 31 is formed upon housing 11 adjacent its open end and communicates with the interior of said housing, and is provided upon its opposite sides with a plurality of water inlet openings 32.

In assembling the device the shaft 25 and cup 24 are projected into housing 11 with said rod pushing cup 20 to the position shown in Fig. 2 at the same time compressing spring 21. A pair of spaced sector shaped water dissolvable pellets or elements 33 are shown positioned within opposed portions of flange 31 with their inner portions projecting transversely into the interior of housing 11 to retainingly bear upon portions of the end wall of cup shaped element 24 to normally retain the same in the position shown against the action of spring 21.

In assembling the device the cork is not mounted upon rod 25 until the pellets 33 have been properly positioned after which the cork is properly positioned and bolted with respect to the rod 25. It will be noted that the inner end of cork 17 supportably bears against pellets 33 however this is not absolutely necessary if the pellets snugly fit within the annular recess of flange 31.

A spring 34, preferably a leaf spring or the like, is interposed between pellets 33 to normally maintain their spaced apart relationship.

The line 16 of Fig. 1 is stacked as at 35 within housing 11 between the cups 20 and 24, and one end of said line projects through the slot 36 in cup 20 and is secured as at 37 to the cap 19 as shown in Fig. 2. The opposite end of said line is joined as at 38 to the cup 24 which is joined to the cork 17 as shown.

In operation should the fishing rod or other article be accidentally dropped so as to become immersed, the pellets 33 will immediately dissolve releasing cup 24 and coiled spring 21 will then be effective to forcefully project the stacked line 25 substantially out from housing 11 and the cup 20 will be projected substantially to the open end of said housing. It is naturally contemplated that the housing 11 could be suitably attached to any article which is likely to be accidentally dropped into a body of water such as a gun or an outboard motor for example.

In the case of an outboard motor or other substantially heavy article the line 16 shown in Fig. 1 may not be sufficiently sturdy for more than merely locating the submerged article. In Figs. 4 to 8 there is shown a slight adaptation to the present retrieving device which includes a container secured to the article and containing a stack of substantially heavy line anchored to the container and with the free end of said heavier line joined to the inner end of the line 16.

A portion of the boat is shown at 39 to which is secured an outboard motor 40 fragmentarily illustrated, and to a portion of its housing is secured, as at 42, a suitable bracket 41, with the latter suitably secured to or integral with hollow storage container 43. The latter positioned upon motor housing 40 has a cover 44 with downturned flanges 45 which slidably fits within the open end of container 43.

A plurality of rectangularly shaped water dissolvable pellets 46 project through transverse slots 47 in the side walls of container 43 adjacent its open end and extend over the top surface of cover 44 for normally retaining the same within the container 43 as illustrated.

Elongated semi-circularly shaped housing 48 has a pair of oppositely arranged horizontal flanges 49 which seat upon cover 44 and are suitably secured thereto by the bolts or rivets 50.

Figure 7:
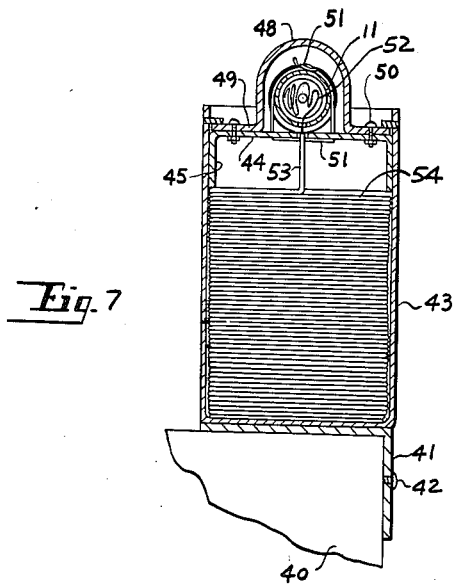
Fig. 7 is a section on line 7—7 of Fig. 6 on an enlarged scale.
Figure 6:
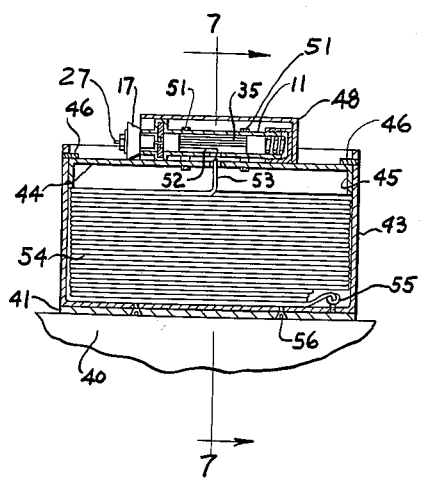
Fig. 6 is an elevational section of the retriever mechanism shown in Fig. 5.
Figure 8:
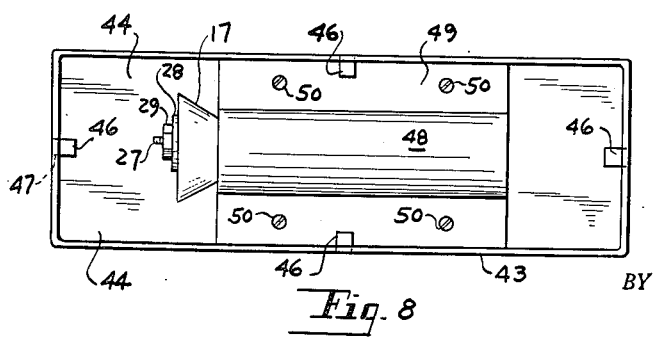
Fig. 8 is a plan view of Fig. 7.

The retriever mechanism including housing 11, shown in detail in Fig. 2, is then longitudinally positioned within housing 48 and secured therein and with respect to the top surface of cover 44 by a pair of spaced straps 51 illustrated in Figs. 6 and 7.

The construction of the retriever mechanism within housing 11 is identical with that shown in Fig. 2 with an exception that the end of the line 16 within said housing is not anchored at 37 as shown in Fig. 2 but is designated at 52 in Fig. 6 and extends through an opening in the bottom of housing 11 and into a corresponding opening in cover 44 and is joined to the free end 53 of the heavy line 54 which is suitably stacked within container 43. The other end of the heavy line 54 is anchored as at 55 to a portion of container 43.

As shown in Fig. 6 the container 43 may be secured to bracket 41 as by the bolts 56.

In operation should the outboard motor become accidentally dislodged and submerged, the cork 17 will be first released and will float to the surface A as in Fig. 1 trailing the line 16, the inner end of which is joined to the heavy line 54 within container 43. The pellets 46 also dissolve to permit release of the cover 44 from container 43 so that by pulling upon the upper end of the line 16 the free end of the heavier line 54 may be brought to the surface. Thereafter the motor may be manually lifted by drawing upon line 54 to thereby recover the motor.

Having described my invention reference should now be had to the claims which follow for determining the scope thereof.

I claim:

1. In an article retrieving device having a cylindrical housing open at one end adapted for mounting on said article, a hollow annular flange adjacent said open end, a cork loosely positioned within said open end, a pair of cups facing inwardly from the opposite ends of the housing and slidably positioned therein, a rod projecting through and joined at one end to said cork and to one of said cups, with its inner end operatively engageable with said other cup for positioning and maintaining said other cup within said housing, a coiled spring in said housing between said other cup and the closed end of said housing, a water dissolvable pellet positioned within said flange with a portion projecting into the interior of said housing retainingly engaging the outer end of said one cup for maintaining the same within said housing against the action of said spring, and a folded line in said housing between said cups anchored at one end to said housing and with its free end joined to said one cup.

2. In an article retrieving device having a cylindrical housing open at one end adapted for mounting on said article, a hollow annular flange adjacent said open end, a cork loosely positioned within said open end, a pair of cups facing inwardly from the opposite ends of the housing and slidably positioned therein, a rod projecting through and joined at one end to said cork and to one of said cups, with its inner end operatively engageable with said other cup for positioning and maintaining said other cup within said housing, a coiled spring in said housing between said other cup and the closed end of said housing, a water dissolvable pellet positioned within said flange with a portion projecting into the interior of said housing retainingly engaging the outer end of said one cup for maintaining the same within said housing against the action of said spring, and a folded line in said housing between said cups anchored at one end to said housing and with its free end joined to said one cup, said coiled spring being secured at one end to said housing and at its other end to said other cup.

3. In an article retrieving device having a cylindrical housing open at one end adapted for mounting on said article, a hollow annuar flange adjacent said open end, a cork loosely positioned within said open end, a pair of cups facing inwardly from the opposite ends of the housing and slidably positioned therein, a rod projecting through and joined at one end to said cork and to one of said cups, with its inner end operatively engageable with said other cup for positioning and maintaining said other cup within said housing, a coiled spring in said housing between said other cup and the closed end of said housing, a pair of sector shaped water dissolvable elements oppositely positioned within said annular flange with their inner ends projecting transversely into said housing retainingly engaging the outer end of said one cup for maintaining the same within said housing against the action of said spring, a spring interposed between the inner ends of said dissolvable elements for maintaining the same within said flange, and a folded line within said housing between said cups anchored at one end to said housing with its other end joined to said one cup.

4. In an article retrieving device, a hollow container adapted for mounting on said article, a heavy line stacked within said container and with one end anchored therein, a cover removably positioned within the open end of said container, the latter having a plurality of transverse slots therein adjacent said open end, a plurality of water dissolvable pellets projecting laterally through said slots and extending over a portion of said cover for retaining the same within said container, a cylindrical housing open at one end secured upon said cover, a cork loosely within the open end of said housing, a light line stacked within said housing with one end joined to the free end of said heavy line and with its other end joined to said cork, and water dissolvable means in said housing normally maintaining said cork therein.

5. In an article retrieving device, a hollow container adapted for mounting on said article, a heavy line stacked within said container and with one end anchored therein, a cover removably positioned within the open end of said container, the latter having a plurality of transverse slots therein adjacent said open end, a plurality of water dissolvable pellets projecting laterally through said slots and extending over a portion of said cover for retaining the same within said container, a cylindrical housing open at one end secured upon said cover, a cork loosely within the open end of said housing, a light line stacked within said housing with one end joined to the free end of said heavy line and with its other end joined to said cork, spaced cups facing inwardly from the opposite ends of said housing and slidable therein for retaining said light line, a coiled spring within said housing normally urging said cups outwardly thereof for releasing said cork and light line, and water dissolvable means in said housing normally maintaining said cork therein against the action of said coiled spring.

6. In an article retrieving device having an elongated hollow housing open at one end adapted for mounting on said article, a cork, loosely positioned within said open end, a pair of cups facing inwardly from the opposite ends of the housing slidably positioned therein, a rod projecting through and joined at one end to said cork and to one of said cups, with its inner end cooperatively engageable with said other cup for positioning and maintaining said other cup within said housing, a coiled spring in said housing between said other cup and the closed end of said housing, a water dissolvable pellet positioned and retained within said housing with a portion of said pellet projecting into the interior of said housing retainingly engaging the outer end of said one cup for maintaining the same within said housing against the action of said spring, and a folded line in said housing between said cups anchored at one end to said housing and with its free end joined to said one cup.

ERNEST KRANTZ.

REFERENCES CITED

The following references are of record in the file of this patent:

UNITED STATES PATENTS

| Number | Name | Date |
|---|---|---|
| 2,190,531 | Kaboskey et al. | Feb. 13, 1940 |
| 2,341,799 | Luby | Feb. 15, 1944 |
| 2,479,021 | Perkins | Aug. 16, 1949 |